United States Patent [19]

Calistrat

[11] 4,164,855
[45] Aug. 21, 1979

[54] SEGMENTED DRIVING SHAFT
[75] Inventor: Michael M. Calistrat, Sykesville, Md.
[73] Assignee: Koppers Company, Inc., Pittsburgh, Pa.
[21] Appl. No.: 932,343
[22] Filed: Aug. 9, 1978
[51] Int. Cl.² ............................................... F16C 1/02
[52] U.S. Cl. ........................................ 64/2 P; 64/2 R
[58] Field of Search .................................. 64/2 R, 2 P

[56] References Cited
U.S. PATENT DOCUMENTS

| | | | |
|---|---|---|---|
| 860,013 | 7/1907 | Church | 64/2 P |
| 2,570,335 | 10/1951 | Fitch | 64/2 R |
| 2,592,055 | 4/1952 | Monahan | 64/2 P |
| 2,895,314 | 7/1959 | Helm | 64/2 P |
| 3,958,649 | 5/1976 | Bull | 64/2 P |

FOREIGN PATENT DOCUMENTS 7176 of 1912 United Kingdom ..................... 64/2 R Primary Examiner—Charles J. Myhre
Assistant Examiner—R. C. Turner
Attorney, Agent, or Firm—Thomas L. Sivak; Oscar B. Brumback

[57] ABSTRACT

Disclosed is an improved segmented driving shaft in which the torque is transmitted from roll segment to roll segment through flexible gear-type couplings. The shaft includes a plurality of alignment tubes which reduces the angle of misalignment of the gear-type couplings.

2 Claims, 1 Drawing Figure

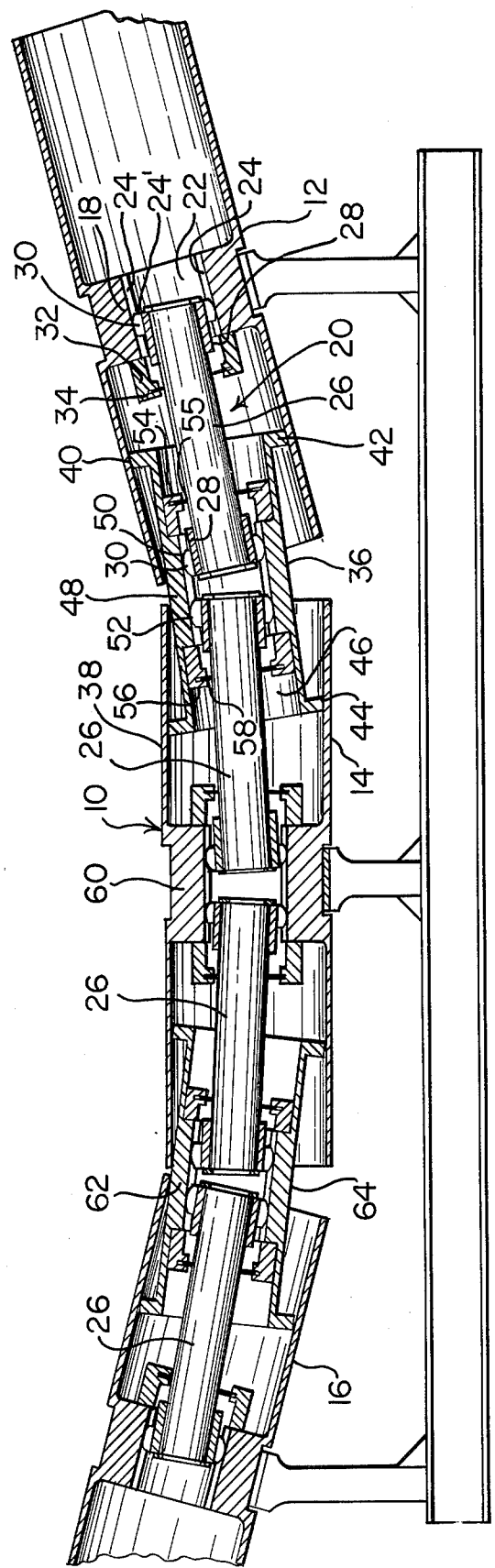

SEGMENTED DRIVING SHAFT

BACKGROUND OF THE INVENTION

1. Field of the Invention

This invention relates to segmented drive shafts and more particularly to segmented drive shafts wherein the segments may be misaligned at more than six degrees.

2. Description of the Prior Art

Segmented drive shafts are used in many applications. An example is the drive roller system of a belt conveyor. Typically, torque has been transmitted to the individual segments of the drive shaft through a plurality of universal joints. While performing somewhat satisfactorily as the means of power transmission, the use of universal joints present certain problems. The motion transmitted through a series of universal joints connecting non-parallel shafts can fluctuate widely and the joints are necessarily exposed and therefore are subject to dust contamination and corrosion. While these problems have been recognized, it has heretofore been beyond the state of present technology to substitute a gear type coupling for the universal joints.

Accordingly, it is among the objects of the present invention to provide a segmented drive shaft in which the motion transmitted to the individual segments is substantially uniform and which has coupling elements which are longer lasting and more reliable.

SUMMARY OF THE INVENTION

These and other objects of the present invention are achieved by providing a segmented drive shaft, the first individual segment of which is driven by a powered prime mover. Each successive segment is driven through a gear type coupling. Inserted within adjacent ends of the individual segments is an alignment tube. The alignment tube is adapted to receive one end of the shaft of the coupling. However, torque is not transmitted by the alignment tube to the individual segments, but though the coupling shafts directly to the individual segments. The alignment tube reduces the angle of misalignment of the shafts of the gear coupling. The present invention provides an improved segmented drive shaft which is more economical and reliable than the prior art shafts. The foregoing will more fully appear in the following detailed description of the specification when read in conjunction with the accompanying drawing FIGURE.

BRIEF DESCRIPTION OF THE DRAWING

The FIGURE is an elevational view partly in section of the segmented drive shaft of the present invention.

DESCRIPTION OF THE PREFERRED EMBODIMENT

Referring to the FIGURE, a segmented drive shaft generally designated 10 has a roller 12 driven at A by a powered prime mover, not shown. The drive shaft is comprised of a series of driven roll segments 14 and 16. The number of driven rolls forms no part of the present invention and the number of such and the length of each is a matter of application of the drive shaft. Roll 12 and driven roll 14 and 16 can be made of any suitable material such as a high carbon steel. Intermediate the length of roller 12 a sleeve 18 is formed for coupling 20. Sleeve 18 has an internal axial bore 22, the inner surface 24 of which is formed into a plurality of involatile straight conventional gear teeth 24. Coupling 20 includes a shaft 26 having keyed in a conventional manner at the ends thereof hubs 28. Formed on the outer surface of hub 28 are a plurality of conventional curved gear teeth 30 which are adapted to mesh and coact with teeth 24. Flange 32 of sleeve 18 includes a conventional shaft seal 34 to maintain the lubricant within cavity 22 of the coupling.

Inserted within the adjacent ends of rolls 12 and 14 is an alignment tube 36. Alignment tube 36 is in supporting engagement with rolls 14 and 16 at points 38, 40, 42 and 44 and is adapted to rotate with rolls 14 and 16. Alignment tube 36 is made of a material similar to the rolls. Alignment tube 36 has an axial bore 46. The intermediate portion 48, which acts as the gear coupling sleeve of bore 46 is formed into sets of circumferentially spaced involute conventional flat gear teeth. Teeth 50 are adapted to mesh and coact with teeth 30 of hub 28. Flanges 54 and 56 have mounted therein shaft seals 56 which retain conventional packed lubricant within the defined area. It will be understood that the construction tube of the intermediate sections 60 of roll 14 and 62 of alignment tube 64 are constructed and function identically to that described for roll 12 and alignment tube 36. The intermediate section 60 which serves in the manner of sleeve 18 of roll 14 has a pair of circumferentially spaced flat gear teeth to mesh and coact with the gear teeth 32 of the hub 30 of shafts 26, the construction of which is described above. It is understood by those skilled in the art that if roll 12 were connected to the powered prime mover by means of a gear coupling, its construction would be identical to that of roll 14.

In operation, it is seen that the torque provided by the prime mover is transmitted from adjacent roll to adjacent roll by means of shafts 26 of the gear type coupling. While I have described a certain preferred embodiment of my invention, it will be understood it may be otherwise embodied within the scope of the following claims.

What is claimed:

1. An improved segmented driving shaft, said shaft driven by a powered prime mover, comprising:
   (a) a plurality of operably connected driven roll members, said rolls having an inner axial bore, the first of said driven roll members being operably connected to said prime mover.
   (b) a plurality of alignment tube members inserted in and in contact with adjacent ends of said rolls to form a continuous segmented shaft, said tube members having an inner axial bore.
   (c) internal gear teeth means formed within said axial bores of said roll members and said tube members.
   (d) a plurality of shaft means extending within said axial bores of said roll and tube members having external gear teeth thereon, said external gear teeth of said shafts adapted to mesh and coact with said internal gear teeth, of said roll and tube members said shafts means adapted to transmit torque from one of said roll members to the adjacent roll members.

2. The improved segmented driving shaft of claim 1 wherein the ratio of the length of the alignment tube members to the length of the roll members is 1:2.

* * * * *